(12) United States Patent
Gadzella et al.

(10) Patent No.: US 8,985,234 B2
(45) Date of Patent: Mar. 24, 2015

(54) SYSTEM FOR APPLYING DOWN PRESSURE IN A COULTER ASSEMBLY

(75) Inventors: Gerard James Gadzella, Saskatoon (CA); Robin Bruno Schilling, Darfield (CA)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 272 days.

(21) Appl. No.: 13/297,038

(22) Filed: Nov. 15, 2011

(65) Prior Publication Data

US 2013/0118391 A1    May 16, 2013

(51) Int. Cl.

| A01B 15/16 | (2006.01) |
|---|---|
| A01B 15/18 | (2006.01) |
| A01B 35/28 | (2006.01) |
| A01B 76/00 | (2006.01) |
| A01C 7/20 | (2006.01) |

(52) U.S. Cl.
CPC ..................................... A01C 7/205 (2013.01)
USPC ........... 172/264; 172/572; 172/705; 172/748; 267/180

(58) Field of Classification Search
CPC ....................................................... A01C 7/205
USPC ............... 132/218, 200; 401/4, 265; 172/261, 172/264, 500, 497, 452, 573, 572, 570, 518, 172/621, 705, 711, 744, 748; 267/180, 166, 267/182
See application file for complete search history.

(56) References Cited

U.S. PATENT DOCUMENTS

| 753,452 | A | | 3/1904 | Van Brunt |
| 945,098 | A | | 1/1910 | Kearin |
| 2,175,282 | A | * | 10/1939 | Cormany ...................... 172/126 |
| 3,194,323 | A | | 7/1965 | Zimmerman |
| 3,314,486 | A | * | 4/1967 | Remy ........................... 172/543 |
| 3,760,882 | A | | 9/1973 | Geurts |
| 3,845,730 | A | | 11/1974 | Koronka et al. |
| 4,011,915 | A | | 3/1977 | Anderson |
| 4,429,750 | A | | 2/1984 | Pope |
| 4,548,277 | A | | 10/1985 | Dietrich, Sr. et al. |
| 5,431,232 | A | | 7/1995 | Kirsch |
| 5,727,638 | A | | 3/1998 | Wodrich et al. |
| 6,834,598 | B2 | | 12/2004 | Juptner |
| 7,044,070 | B2 | | 5/2006 | Kaster et al. |
| 2009/0071500 | A1 | * | 3/2009 | Wyatt et al. .................... 132/218 |
| 2009/0106908 | A1 | * | 4/2009 | DeFranks et al. ................. 5/716 |
| 2011/0120357 | A1 | | 5/2011 | Schilling et al. |

FOREIGN PATENT DOCUMENTS

| EP | 0313834 A1 * | 5/1989 |
| WO | WO 2011105203 A1 * | 9/2011 |

* cited by examiner

*Primary Examiner* — Christopher J Novosad
(74) *Attorney, Agent, or Firm* — Rebecca L. Henkel

(57) ABSTRACT

A coulter assembly for an agricultural implement. The coulter assembly includes a support structure and a disc blade rotatably mounted to the support structure. The coulter assembly also includes a spring assembly coupled to the support structure and configured to urge the disc blade into soil. The spring assembly includes a variable rate spring.

5 Claims, 4 Drawing Sheets

US 8,985,234 B2

SYSTEM FOR APPLYING DOWN PRESSURE IN A COULTER ASSEMBLY

BACKGROUND

The invention relates generally to coulter assemblies and, more particularly, to a system for applying down pressure in a coulter assembly.

In agricultural settings, disc openers are typically mounted to an implement, which is towed behind a work vehicle, such as a tractor. Disc openers are generally configured to form a trench in soil, and to deliver seeds, fertilizer, or other products into the trench. Specifically, certain disc openers include a disc, such as a coulter, that cuts into the soil as the disc opener moves along the terrain. A penetration depth of the disc is generally regulated by a gauge wheel, which is typically positioned adjacent to the disc, and rotates across the soil surface. The disc is positioned below the gauge wheel such that the disc penetrates the soil. A vertical offset distance between the disc and the gauge wheel determines the penetration depth (e.g., seed depth, furrow depth) of the disc.

Such disc openers often include down pressure assemblies for urging the discs of the disc openers into the soil. In certain configurations, the down pressure assemblies enable the disc openers to follow the contours of the terrain. Such down pressure assemblies may use a spring that compresses or decompresses as the disc opener moves across the contours of the terrain. To establish a desired down force for the expected soil conditions, an appropriate spring may be selected. For example, a soft spring may be mounted to the down pressure assembly to establish a desired trench within soft soil, and to enable the disc to follow the contours of the soft soil terrain. Conversely, a hard spring may be mounted to the down pressure assembly to establish a desired trench within hard soil, and to enable the disc to follow the contours of the hard soil terrain. Unfortunately, the soft spring may not provide sufficient force to establish the desired trench in the hard soil, and the hard spring may not enable the disc to follow the contours of the soft soil. Consequently, an operator may replace each spring within an implement based on soil conditions. Due to the number of disc openers within an implement, the process of replacing each spring may be inconvenient, and may significantly increase the duration of seeding, planting and/or fertilizing operations.

BRIEF DESCRIPTION

In one embodiment, a coulter assembly for an agricultural implement includes a support structure and a disc blade rotatably mounted to the support structure. The coulter assembly also includes a spring assembly coupled to the support structure and configured to urge the disc blade into soil. The spring assembly includes a variable rate spring.

In another embodiment, a coulter assembly for an agricultural implement includes a support structure and a disc blade rotatably mounted to the support structure. The coulter assembly also includes a spring assembly having a first end coupled to the support structure, and a second end configured to mount to a rockshaft. The spring assembly is configured to urge the disc blade into soil. The spring assembly includes a variable rate spring. The coulter assembly includes an actuator configured to adjust a position of the support structure relative to the soil.

In another embodiment, a coulter assembly for an agricultural implement includes a spring assembly configured to urge a disc blade into soil. The spring assembly includes a variable rate spring.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
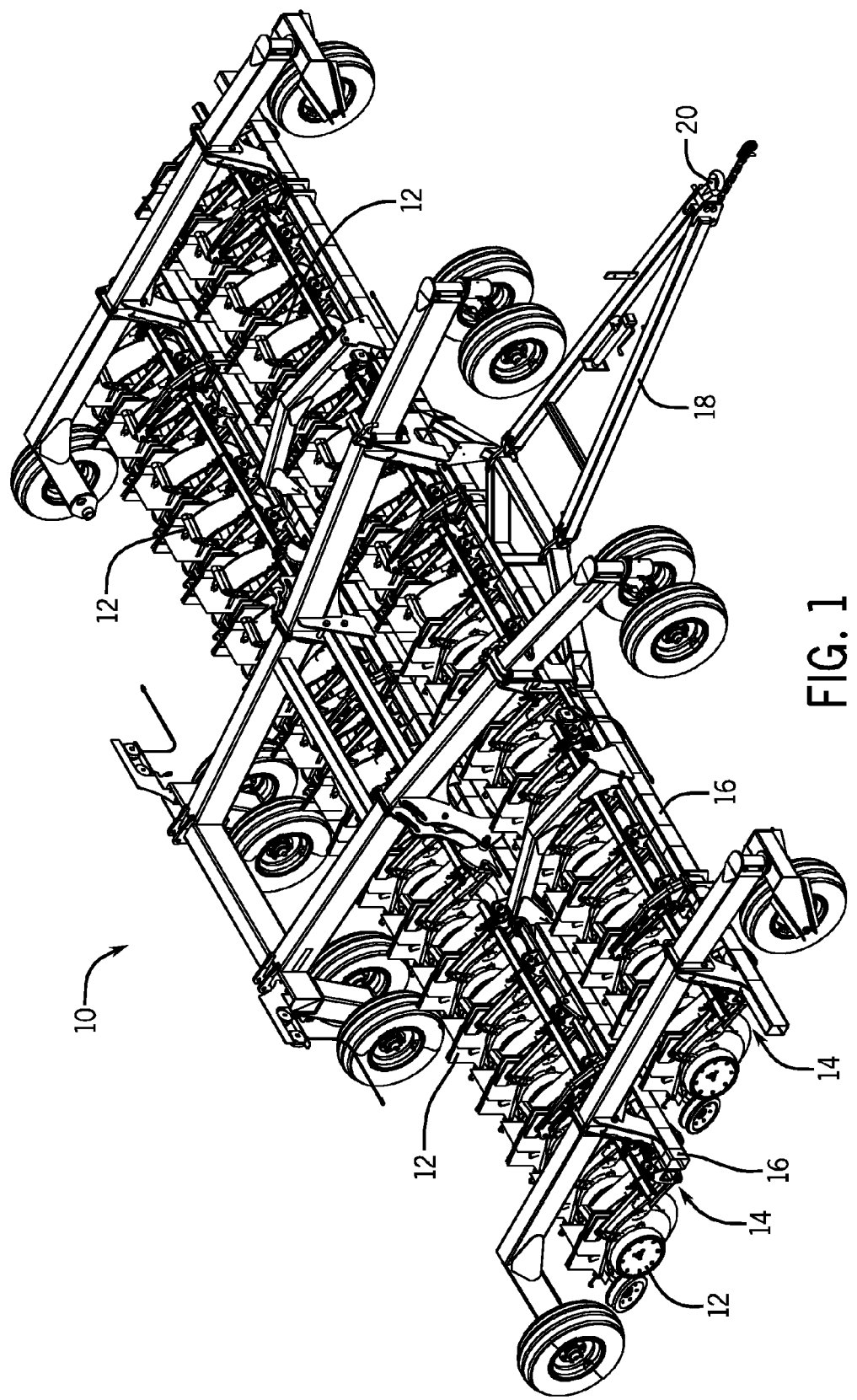
FIG. 1 is a perspective view of a towable agricultural implement including multiple disc openers.

FIG. 1 is a perspective view of a towable agricultural implement 10, including multiple disc openers 12. As discussed in detail below, each disc opener 12 includes a disc (e.g., coulter) configured to form a trench in soil. A product delivery assembly positioned behind the disc is configured to inject a product (e.g., seed, fertilizer, etc) into the trench. As illustrated, parallel linkage assemblies 14 secure the disc openers 12 to a tool bar 16. In the present embodiment, the tool bar 16 includes 36 disc openers 12. Further embodiments may include more or fewer disc openers 12. For example, certain embodiments may include 30, 36, 40, 48, 60, 64, 72, 80, 96, or more disc openers 12. The tool bar 16 is coupled to a tow bar 18, including a hitch 20. The hitch 20 may, in turn, be coupled to a tractor or air cart such that the towable agricultural implement 10 may be pulled through a field.

As discussed in detail below, each disc opener 12 includes a variable rate spring configured to urge a disc of the disc opener 12 into the soil, and to hold the disc within the soil as the disc opener 12 travels across contours of the terrain (e.g., soil surface). The variable rate spring enables the disc openers 12 to operate within hard and/or soft terrains, and to form shallow and/or deep trenches. For example, the variable rate spring may include a stiffer portion to provide a desired down force for operating the disc opener 12 in hard soil terrains, and a softer portion to provide a desired down force for operating the disc opener 12 in soft soil terrains. In such a configuration, the desired portion of the variable rate spring may be selected by compressing the spring prior to operation (e.g., via an actuator configured to drive the disc into the soil). With the variable rate spring, the disc openers 12 may operate effectively through hard and soft soil terrains, and effectively form shallow and deep trenches. As a result, the depth of the trenches formed by the disc openers 12 may be maintained at a desired level. Consequently, the product (e.g., seeds, fertilizers, etc.) may be deposited by the disc openers 12 at a consistent depth.

Figure 2:
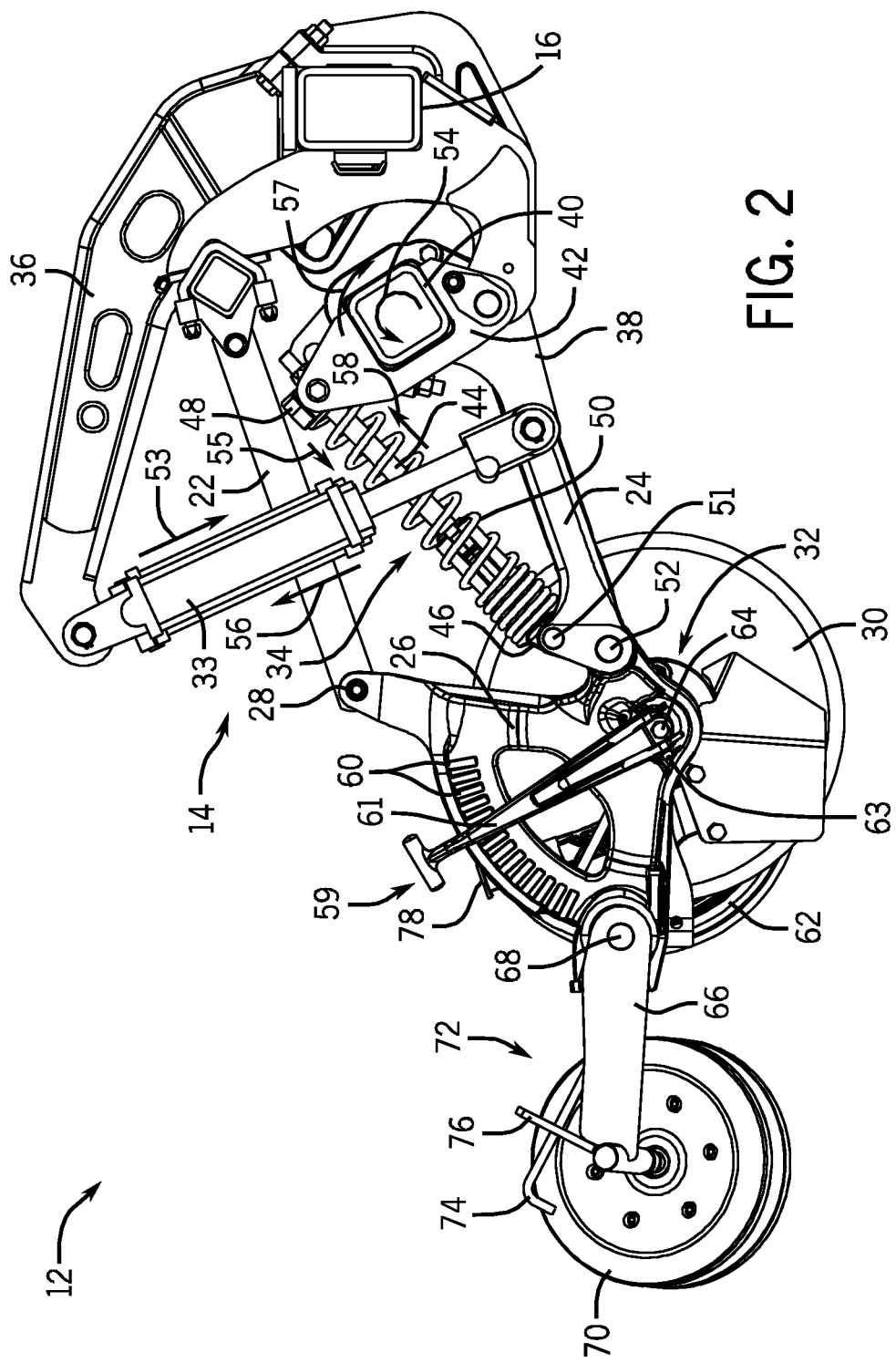
FIG. 2 is a side view of an embodiment of a disc opener with a variable rate spring that may be employed within the towable agricultural implement of FIG. 1.

FIG. 2 is a side view of an embodiment of a disc opener 12 with a variable rate spring that may be employed within the towable agricultural implement 10 of FIG. 1. The disc opener 12 (e.g., coulter assembly) is coupled to the tool bar 16 via the parallel linkage assembly 14. The parallel linkage assembly 14 is formed by an upper link 22 and a lower link 24. As illustrated, an end of the upper link 22 is rotatably coupled to a support structure 26 by a fastener 28. The parallel linkage assembly 14 enables the disc opener 12 to raise and lower relative to the tool bar 16 in response to obstructions or variations in the terrain. The disc opener 12 also includes a disc 30 (e.g., disc blade, coulter, etc.) rotatably coupled to the support structure 26 by a bearing assembly 32. The bearing assembly 32 enables the disc 30 to freely rotate as the disc engages the soil and forms a trench. As illustrated, an outer circumference of the disc 30 has a sharpened edge for penetrating the soil.

A hydraulic actuator 33 is configured to adjust a position of the support structure 26 relative to the tool bar 16, thereby compressing and/or decompressing a spring assembly 34. In certain embodiments, the actuator 33 is coupled to an entire set of openers 12, and configured to simultaneously adjust the position of respective support structures 26. As illustrated, a first end of the hydraulic actuator 33 is pivotally coupled to a cylinder support arm 36, and a second end of the hydraulic actuator 33 is pivotally coupled to a bracket 38. The bracket 38 links the hydraulic actuator 33 to a rockshaft 40. The spring assembly 34 is also coupled to the rockshaft 40 via spring trunnion rocker arms 42. The pressure applied by the hydraulic actuator 33 may vary in order to rotate the rockshaft 40, which adjusts the compression of the spring assembly 34, thereby adjusting a force applied to the disc opener 12. The spring assembly 34 includes a bolt/tube assembly 44 that connects a lower trunnion 46 to an upper trunnion 48. The bolt/tube assembly 44 and lower trunnion 46 are surrounded by a variable rate compression spring 50. The upper trunnion 48 of the spring assembly 34 is coupled to the spring trunnion rocker arms 42 so that the spring 50 compression is adjusted when the spring trunnion rocker arms 42 are moved by rotation of the rockshaft 40. The lower trunnion 46 of the spring assembly 34 is rotatably coupled to the lower link 24 by a fastener 51 to enable the spring assembly 34 to rotate relative to the lower link 24. Furthermore, the lower link 24 is rotatably coupled to the support structure 26 by a fastener 52 to facilitate rotation of the lower link 24 relative to the support structure 26.

Extension of the actuator 33 in a direction 53 drives the trunnion rocker arms 42 to rotate in a direction 54, thereby moving the upper trunnion 48 in a direction 55. Eventually, the disc 30 engages the soil and is pushed into the soil until the gauge wheel 62 makes contact with the soil surface. Because the disc 30 is engaged with the soil, movement of the lower trunnion 46 is blocked. Consequently, extension of the actuator 33 compresses the spring 50, as the upper trunnion 48 is driven toward the lower trunnion 46. When the spring 50 is compressed, the spring 50 applies a down force that urges the disc 30 into the soil until the gauge wheel rests on the soil surface. In such a position, the variable rate spring 50 may still flex and allow the disc 30 to move in response to conditions of the terrain. Retraction of the actuator 33 in a direction 56 drives the trunnion rocker arms 42 to rotate in a direction 57, thereby moving the upper trunnion 48 in a direction 58. Consequently, retraction of the actuator 33 decompresses the spring 50, as the upper trunnion 48 is driven away from the lower trunnion 46. When the variable rate spring 50 is sufficiently decompressed, retraction of the actuator 33 will cause the upper trunnion 48 to reach a stop and further retraction of the actuator 33 will cause the disc 30 to be removed from the soil. In certain embodiments, the actuator 33 may be arranged so that when the actuator 33 is extended, the spring 50 is decompressed, and when the actuator 33 is retracted, the spring 50 is compressed.

The support structure 26 includes a depth adjustment assembly 59 having depth gauge notches 60 and a depth adjustment arm 61. The depth adjustment assembly 59 is configured to adjust a position of a gauge wheel 62 relative to the disc 30. The depth adjustment arm 61 may be manually moved to a desired notch 60 to change the position of the gauge wheel 62. The depth adjustment arm 61 is rotatably coupled to the support structure 26 by a spindle 63 and a pivot pin 64 that enable the depth adjustment arm 61 to be adjusted among the depth gauge notches 60. Furthermore, the spindle 63 couples the depth adjustment arm 61 to the gauge wheel 62. Because the gauge wheel 62 travels along the surface of the soil, varying the position of the gauge wheel 62 alters the penetration depth of the disc 30 into the soil. In certain embodiments, the gauge wheel 62 is positioned against the disc 30 to remove soil from a lateral side of the disc 30 during operation.

A support arm 66 is rotatably coupled to the support structure 26 by a fastener 68. A packer wheel 70 is coupled to the support arm 66, and configured to close the trench formed by the disc 30, thereby burying product placed in the trench. The down force applied to the packer wheel 70 may be varied by an adjustment assembly 72. The adjustment assembly 72 includes a torsion spring 74 that may be moved between notches 76 to set the desired down force applied to the packer wheel 70. The disc opener 12 also includes a seed tube 78 configured to facilitate a flow of product into the trench.

As illustrated, the variable rate spring 50 is a coil spring including two different pitches. The portion of the variable rate spring 50 having the smaller pitch provides a lower spring constant, and may be used for soft soil terrains and for forming shallow trenches (e.g., for applying less force than the portion of the variable rate spring 50 with the smaller pitch). Conversely, the portion of the variable rate spring 50 having the larger pitch provides a higher spring constant, and may be used for hard soil terrains and for forming deep trenches (e.g., for applying more force than the portion of the variable rate spring 50 with the larger pitch). In certain embodiments, the hydraulic actuator 33 may rotate the rockshaft 40 to control which portion of the variable rate spring 50 is being used (e.g., to control the amount of force applied to the terrain). Thus, using the variable rate spring 50, the disc opener 12 may form a trench having a consistent depth (e.g., for planting) within a variety of terrains. Further, the force applied by the variable rate spring 50 is not dependent upon manual adjustment spring parameters. Instead, the variable rate spring 50 is configured to automatically provide a desired force based on spring compression. Therefore, the variable rate spring 50 obviates the process of spring replacement and/or manual adjustment that may substantially increase the duration associated with farming operations.

Figure 3:
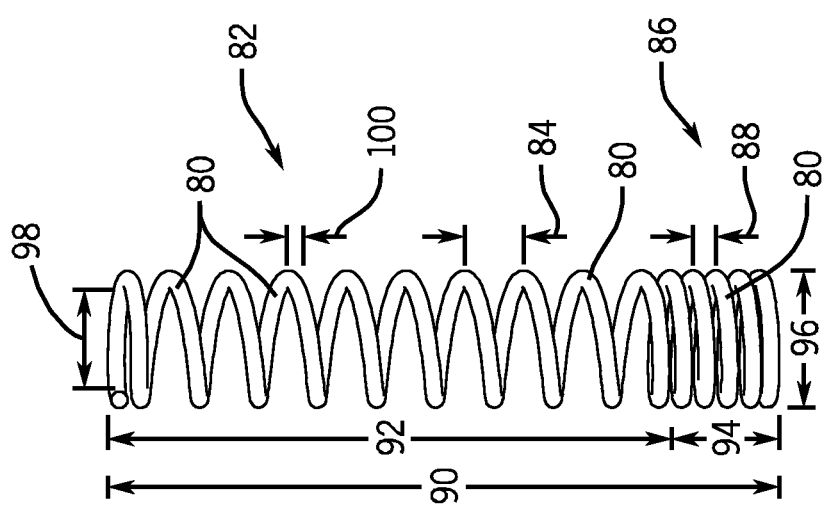
FIG. 3 is a front view of an embodiment of a variable rate spring that may be employed within the disc opener of FIG. 2.

FIG. 3 is a front view of the variable rate spring 50 that may be employed within the disc opener 12 of FIG. 2. In this embodiment, the variable rate spring 50 includes approximately 16 coils 80. In other embodiments, the number of coils 80 may vary (e.g., there may be 8, 12, 16, 20, or 30 coils 80 on the variable rate spring 50). A first portion 82 of the variable rate spring 50 includes approximately 10 coils 80 that have a first pitch 84. In addition, a second portion 86 of the variable rate spring 50 includes approximately 6 coils 80 that have a second pitch 88. In certain embodiments, the second portion 86 may have more coils than the first portion 82. As will be appreciated, the pitch is the distance from the center of one coil 80 of the spring 50 to the center of an adjacent coil 80 of the spring 50. As illustrated, the first pitch 84 is greater than the second pitch 88. However, in alternative embodiments the first pitch 84 may be smaller than the second pitch 88. In certain embodiments, the first pitch 84 may be within a range of approximately 10 to 30 mm, 20 to 45 mm, or to 50 mm, for example. Further, in certain embodiments, the second pitch 88 may be within the range of approximately 5 to 15 mm, 10 to 25 mm, or 20 to 35 mm, for example. In such embodiments, the first pitch 84 may be approximately 10 to 500 percent larger than the second pitch 88 (e.g., the second pitch 88 may be approximately 20 to 90 percent of the first pitch 84). In the present embodiment, there are approximately 40 percent fewer coils in the second portion 86 than in the first portion 82 (i.e., the first portion 82 has approximately 167 percent of the coils in the second portion 86). In other embodiments, the first portion 82 may have approximately 10 to 90 percent, 75 to 150 percent, or 150 to 250 percent of the coils in the second portion 86. It should be noted that in some embodiments, the spring 50 may be constructed to have a continuously variable pitch.

The variable rate spring 50 has a length 90 that includes a length 92 of the first portion 82 and a length 94 of the second portion 86. As will be appreciated, the lengths 90, 92, and 94 may be particularly selected based on the geometry of the disc opener 12 and/or the desired down force. For example, the length 90 may be approximately 200 to 400 mm. In such embodiments, the length 92 may be approximately 150 to 350 mm, and the length 94 may be approximately 50 to 250 mm. Further, the variable rate spring 50 has an outer diameter 96 and an inner diameter 98. In certain embodiments, the outer diameter 96 may be approximately 25 to 150 mm and the inner diameter 98 may be approximately 10 to 130 mm. As will be appreciated, the outer diameter 96 is approximately equal to the inner diameter 98 plus twice a coil diameter 100. For example, if the coil diameter 100 is 5 mm and the inner diameter 98 is 60 mm, than the outer diameter 96 is about 70 mm. The coil diameter 100 may be any suitable value, such as a diameter in the range of approximately 5 to 20 mm. As will be appreciated, the stiffness of the spring 50 is at least partially dependent upon the diameter 100 of the coil. The variable rate spring 50 may be manufactured using any suitable material (e.g., stainless steel, alloy steel, music wire, phosphor bronze, etc.).

In the illustrated embodiment, a spring constant of the second portion 86 is less than a spring constant of the first portion 82. In certain embodiments, the spring constant of the first portion 82 may be approximately 25 to 30 N/m and the spring constant of the second portion 86 may be approximately 15 to 25 N/m. As will be appreciated, in some embodiments, the spring constant of the first portion 82 may be approximately 5 to 30 percent, 20 to 40 percent, or 35 to 100 percent more than the spring constant of the second portion 86. During operation, the hydraulic actuator 33 may extend to drive the disc 30 into the soil, thereby applying a force to the variable rate spring 50. As the variable rate spring 50 is compressed, the second portion 86 compresses more than the first portion 82 due to the lower spring constant. While the second portion 86 is partially compressed, movement of the gauge wheel 62 across the soil surface compresses and decompresses the spring 50 as the gauge wheel encounters variations in the terrain. Due to the partial compression of the second portion 86 and the lower spring constant of the second portion 86, the second portion 86 provides a substantial portion of the down force applied to the support structure 26. Consequently, the down force provided by the second portion 86 may be suitable for driving the disc 30 into softer soil, or for establishing a shallower trench.

For fields with harder soil or for forming deeper trenches, the hydraulic actuator 33 may extend farther to provide additional spring compression. As the second portion 86 compresses, the force applied by the second portion 86 increases, thereby driving the first portion 82 to compress. In this configuration, movement of the gauge wheel 62 across the soil surface compresses and decompresses both the first and second portions 82 and 86 of the variable rate spring 50 as the gauge wheel encounters variations in the terrain. The higher spring constant of the first portion 82 provides additional down force on the disc 30 to facilitate penetration of harder soil. Therefore, using the variable rate spring 50, two different spring rates may be used to drive the disc 30 into the soil. Thus, the variable rate spring 50 enables the disc opener 12 to form trenches within either soft or hard soil, and/or to form either shallow or deep trenches. Because the spring constant is adjustable by extending or retracting the actuator 33, the desired spring rate may be adjusted while operating the disc openers 12. As a result, the process of replacing springs and/or manually adjusting spring parameters based on soil conditions is obviated, thereby substantially reducing the duration associated with planting, seeding and/or fertilizing operations.

It should be noted that although a continuous coil spring was illustrated and described in this embodiment, in other embodiments, the variable rate spring 50 may have different properties. For example, in certain embodiments, the spring 50 may not be one continuous coil spring, but instead may be two separate coil springs with each of the two separate coil springs having unique spring constants. In such an embodiment, the two separate coil springs may be attached or mounted together to produce results similar to the variable rate spring 50 described above. Further, in some embodiments, the first portion 82 of the spring 50 may be manufactured using a different material than the second portion 86 of the spring 50. For example, the first portion 82 may be formed using a stiff metal and the second portion 86 may be formed using a soft metal. In other embodiments, the diameter 100 of the coils 80 may be variable so that within the first portion 82 of the spring 50, the diameter 100 of the coils 80 is greater than the diameter 100 of the coils 80 in the second portion 86 of the spring 50. As will be appreciated, the diameter 100 of the coils 80 may be variable throughout the whole spring 50. In certain embodiments, the diameter 96 of the spring 50 may be variable such that the first portion 82 has a first diameter 96 and that the second portion 86 has a second diameter 96. Further, the diameter 96 may be variable throughout the whole spring 50 (e.g., conical spring, hourglass spring, barrel spring). In some embodiments, the pitch may be variable throughout the whole spring 50. In addition, the type of spring 50 may be any suitable spring, such as a variable rate leaf spring, beehive spring, and so forth.

Figure 4:
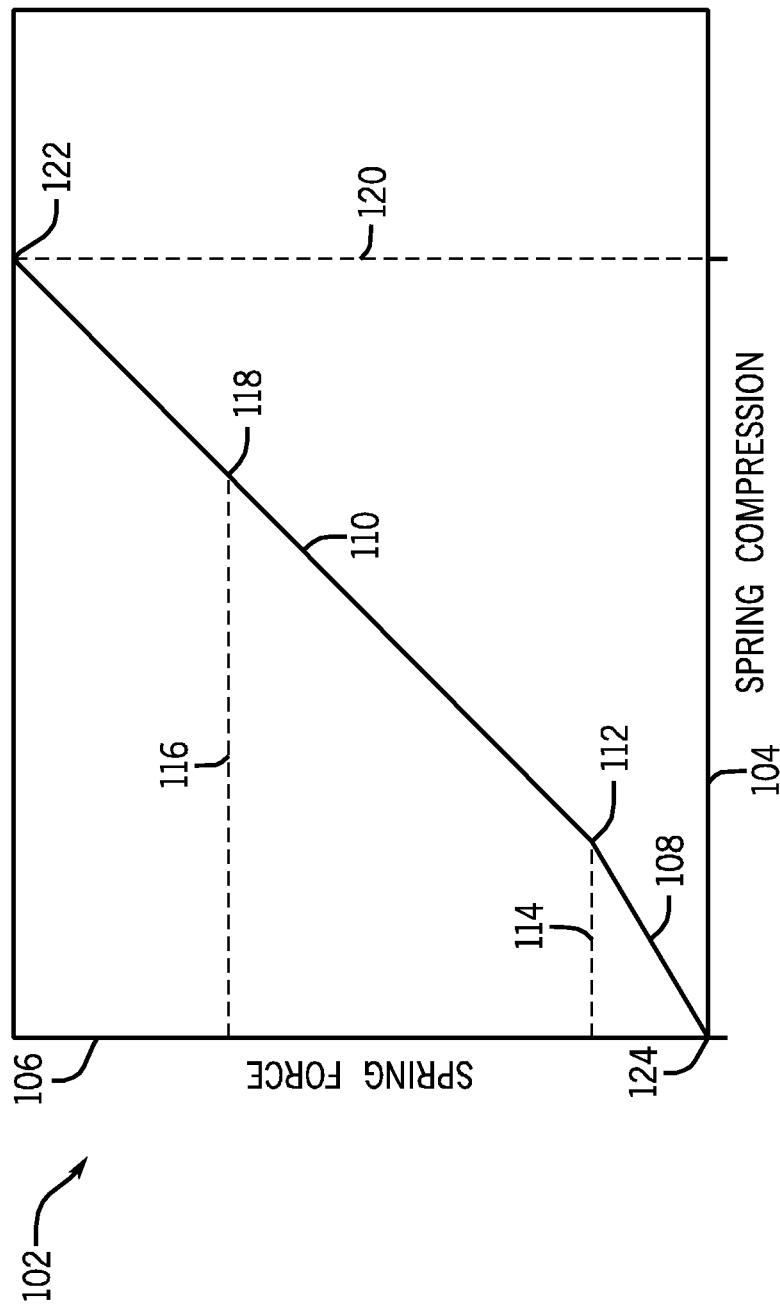
FIG. 4 is a graph illustrating an embodiment of a relationship between spring length and spring force in a variable rate spring.

FIG. 4 is a graph 102 illustrating an embodiment of a relationship between spring compression 104 and spring force 106 in the variable rate spring 50. It should be noted that the spring compression 104 along the x-axis increases as the length of the spring decreases. Further, the spring force 106 increases along the y-axis. At segment 108, the spring force 106 increases at a first rate relative to an increase in the spring compression 104. Then, at segment 110, the spring force 106 increases at a second rate relative to an increase in the spring compression 104. As illustrated, the second rate is greater than the first rate and, at point 112, the variable rate spring 50 changes from the first rate to the second rate.

A force 114 indicates a minimum spring force that may be used to drive the disc opener 12 in soil. Although the force 114 is illustrated at the intersection (i.e., point 112) between the segments 108 and 110, the minimum spring force 114 may be higher or lower in alternative embodiments. Conversely, a force 116 indicates a maximum spring force that may be used to drive the disc opener 12 into soil. Consequently, at point 118, the variable rate spring 50 is compressed to so that the spring 50 provides the maximum spring force 116 that is used during operation of the disc opener 12. Further, a compression 120 indicates a fully compressed spring length. Thus, at point 122, the variable rate spring 50 is fully compressed and exerts the maximum spring force 106 that the variable rate spring 50 is capable of providing. At point 124, the spring is fully decompressed, and the spring 50 provides no spring force 106. As will be appreciated, the variable rate spring 50 may operate within segment 108 when the disc opener 12 is being used in fields with soft soil or to form shallow trenches. Further, the variable rate spring 50 may operate within segment 110 when the disc opener 12 is being used in fields with hard soil or to form deep trenches. Therefore, the variable rate spring 50 may be used to operate the disc opener 12 in hard or soft terrains and to form shallow or deep trenches.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A coulter assembly for an agricultural implement comprising:
a spring assembly configured to urge a disc blade into soil, wherein the spring assembly comprises a variable rate spring having multiple spring constants, and the spring rate of the variable rate spring is configured to vary in response to compression of the variable rate spring.

2. The coulter assembly of claim 1, wherein the variable rate spring comprises a coil spring having a first set of at least three coils with a first pitch, and a second set of at least three coils with a second pitch.

3. The coulter assembly of claim 2, wherein the second pitch is approximately 20 to 40 percent of the first pitch.

4. The coulter assembly of claim 1, wherein the variable rate spring comprises a first portion having a first spring constant, and a second portion having a second spring constant, and wherein the first spring constant is at least 20 percent greater than the second spring constant.

5. The coulter assembly of claim 4, wherein the variable rate spring comprises a coil spring, the first portion comprises a first pitch to establish the first spring constant, and the second portion comprises a second pitch to establish the second spring constant.

* * * * *